O. R. SNYDER.
AIR BRAKE INDICATOR.
APPLICATION FILED AUG. 10, 1909.
947,213.
Patented Jan. 18, 1910.
4 SHEETS—SHEET 3.
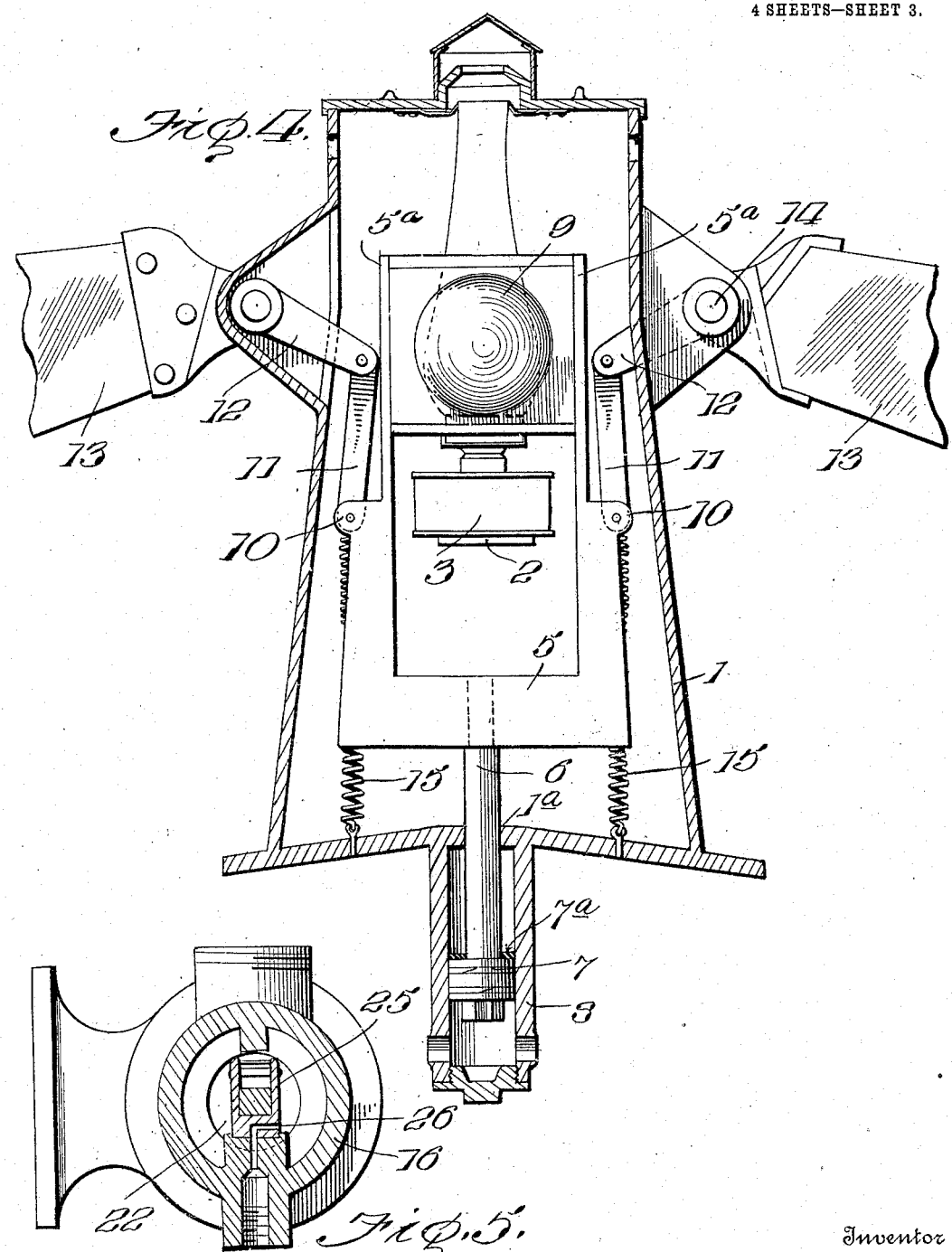
Witnesses
Inventor
O. R. Snyder
By
Attorneys O. R. SNYDER.
AIR BRAKE INDICATOR.
APPLICATION FILED AUG. 10, 1909.
947,213.
Patented Jan. 18, 1910.
4 SHEETS—SHEET 4.
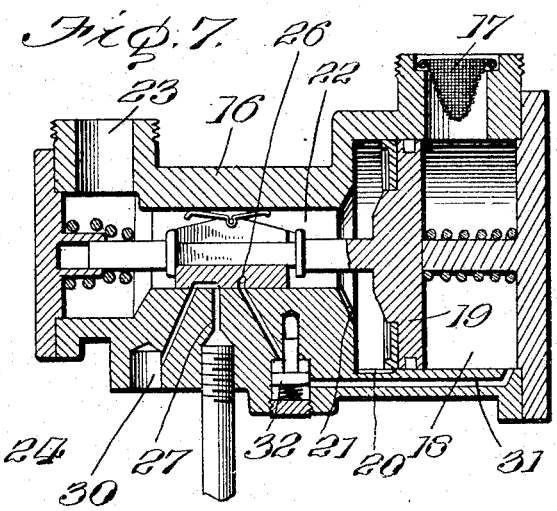
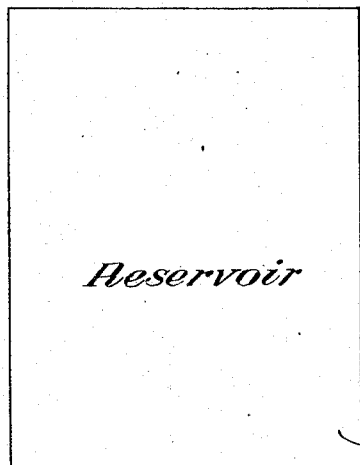
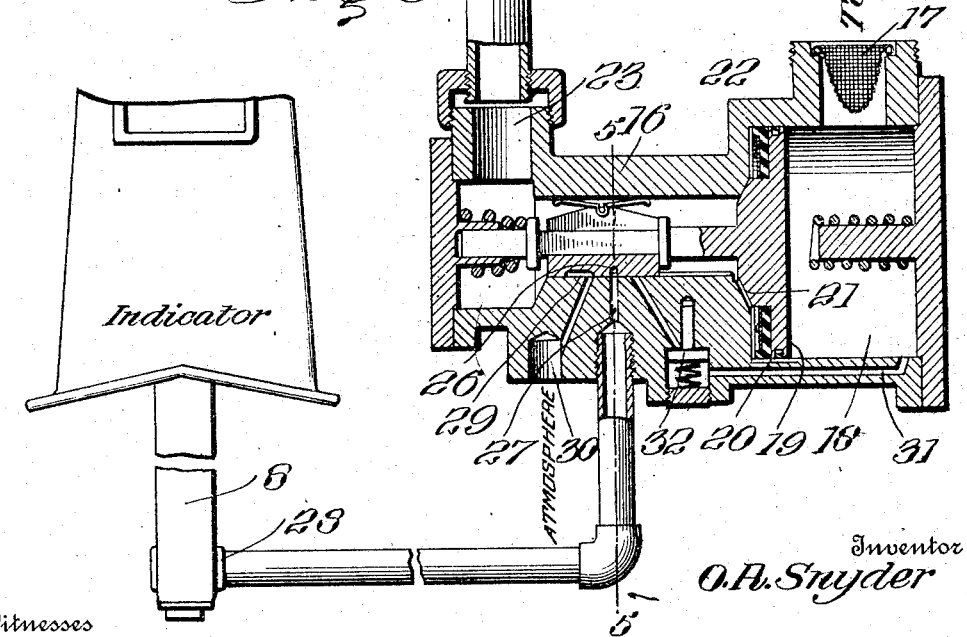
Witnesses
W. H. Woodson
Juana M. Fallin
Inventor
O. R. Snyder
By
H. H. M. Lacey
Attorneys

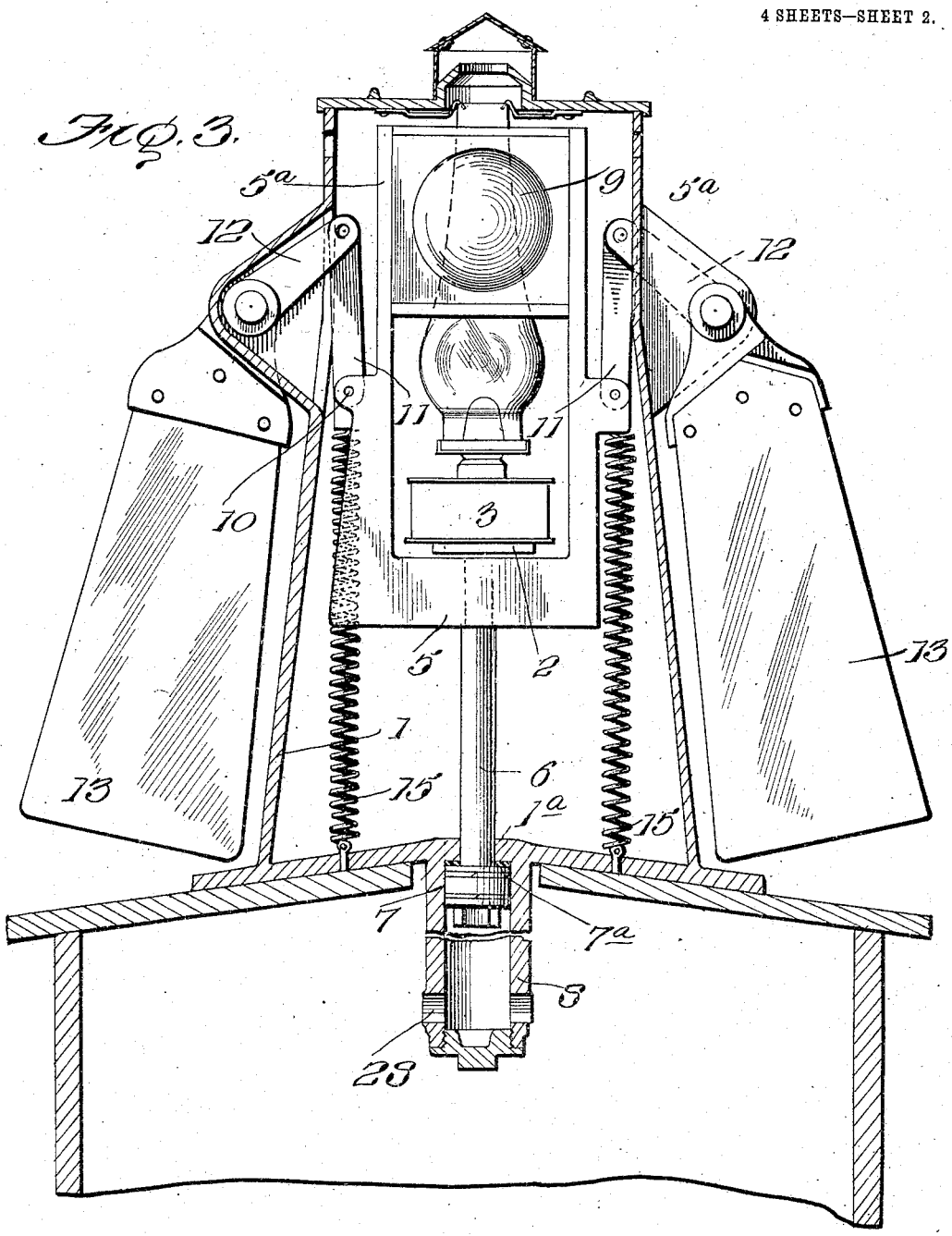

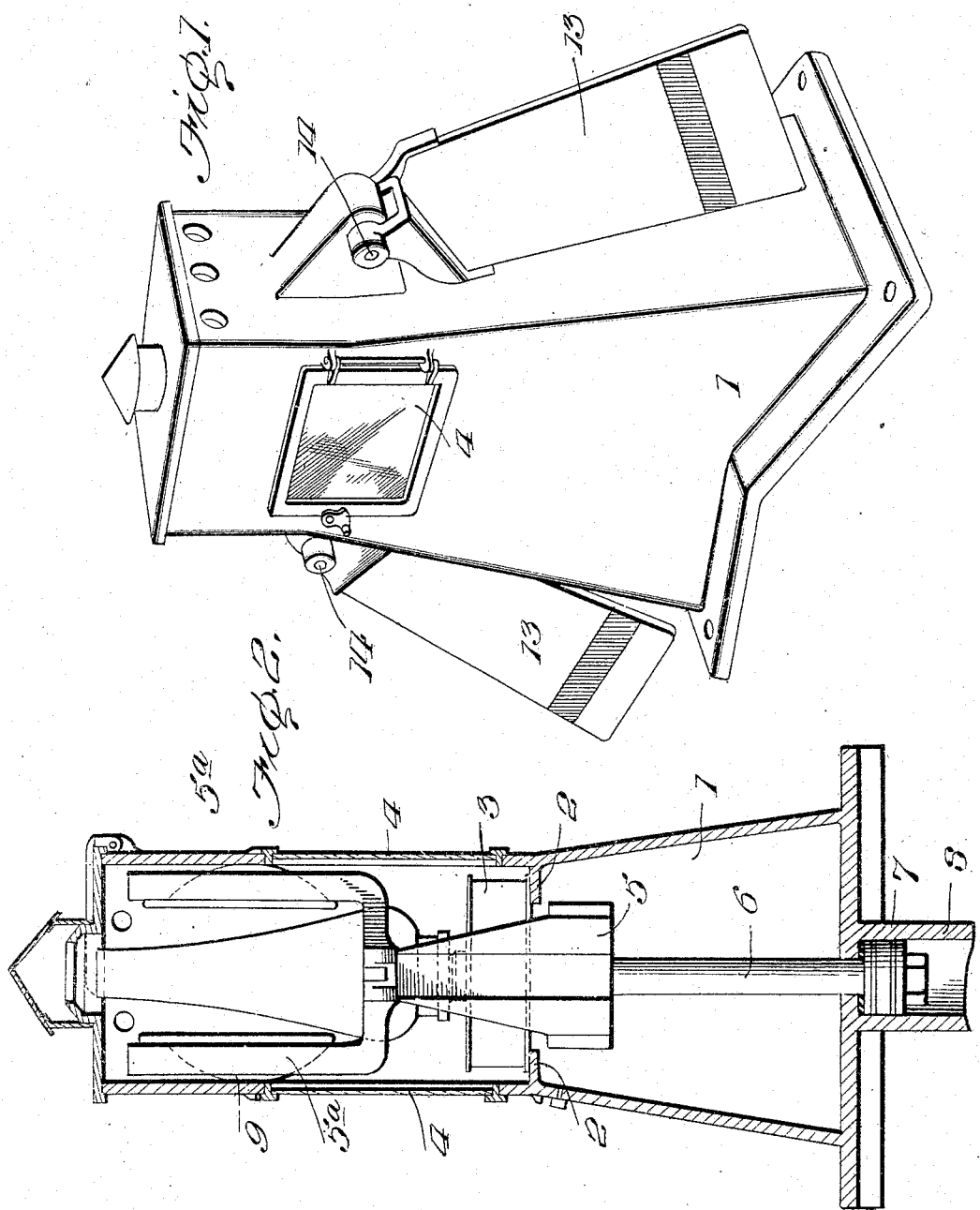

UNITED STATES PATENT OFFICE.

ODIE R. SNYDER, OF KNOXVILLE, TENNESSEE, ASSIGNOR OF ONE-HALF TO JOHN B. JONES, OF KNOXVILLE, TENNESSEE.

AIR-BRAKE INDICATOR.

947,213.  Specification of Letters Patent.  Patented Jan. 18, 1910.

Application filed August 10, 1909. Serial No. 512,167.

*To all whom it may concern:*

Be it known that I, ODIE R. SNYDER, citizen of the United States, residing at Knoxville, in the county of Knox and State of Tennessee, have invented certain new and useful Improvements in Air-Brake Indicators, of which the following is a specification.

This invention comprehends certain new and useful improvements in air brakes and indicators therefor, and relates particularly to an improved construction and arrangement of signaling devices designed to be applied to or incorporated with the caboose or last car of the train, so as to indicate to the engineer whether or not the train line pipe is charged throughout all of the cars of the train, and thereby avoiding the liability of those accidents which are consequent upon the failure of the air brakes to work or to be properly charged from the locomotive to the last car or caboose.

The invention has for its primary object an improved construction of apparatus of this character which will be positive in its action and which will be composed of but comparatively few parts that may be easily manufactured and assembled and not liable to get out of order.

The invention also has for a further object an improved construction of governor mechanism correlated with the main indicator mechanism and assisting in rendering the same sure and positive in its action.

With these and other objects in view the invention consists in certain construction, combinations and arrangements of the parts that I shall hereinafter fully describe and claim.

For a full understanding of the invention reference is to be had to the following description and accompanying drawings, in which:—

Figure 1 is a perspective view of a portion of my improved air brake indicator. Fig. 2 is a transverse sectional view thereof. Fig. 3 is a vertical longitudinal sectional view with parts in their normal inoperative position. Fig. 4 is a similar view with the parts in their operative position. Fig. 5 is a transverse sectional view on the line 5—5 of Fig. 6. Fig. 6 is a sectional side elevation of the mechanism including the governing device, the latter being shown in a normal position, and Fig. 7 is a sectional view of the governing mechanism with parts in a different position.

Corresponding and like parts are referred to in the following description and indicated in all the views of the drawing by the same reference characters.

The casing 1 of the main indicating parts of my improved apparatus may be of any desired construction or design and is arranged for attachment to the cupola or roof of a caboose or last car of a train. At an intermediate point in the height of the casing, the same is provided with an interior ledge or bracket 2 upon which a lantern 3 is supported in a relatively stationary manner. This lantern under normal conditions is designed to show white, its light shining through diametrically opposed corresponding panels 4 within the casing 1, as clearly illustrated in the drawings.

Mounted within the casing 1 is a forked bracket 5, the same being secured on the upper end of a vertically disposed stem 6. The lower end of the stem 6 is provided with a piston 7 which moves within a cylinder 8, secured to, or formed integral with the bottom of the casing 1 and designed to extend downward through the cupola or roof of the car to which the apparatus is applied. The arms of the bracket 5 extend upwardly on opposite sides of the lantern 3 and their upper extremities are forked as indicated at 5ᵃ and carry red lenses 9, which under normal conditions are hidden within the opaque upper end of the casing, and which are designed, when the piston 7 and stem 6 are lowered, to come in registry with the light of the lantern 3 so as to show red through both the panels 4. The bracket 5 is also provided, at points intermediate of the length of its arms, with pairs of apertured ears 10. Links 11 are pivotally connected at one end between the respective ears and are pivotally connected at their upper ends to the inwardly extending arms 12 of semaphores 13, the same being pivoted within lateral enlargements of the casing, as indicated at 14. In the normal positions of the parts, the semaphores 13 are lowered, as illustrated in Fig. 3, but when the bracket 5 is permitted to move downwardly it is evident that the semaphores will be raised to a substantially horizontal position indicating danger or an abnormal condition of the air brakes, while at the same time the lenses 9 will be lowered in registry with the light of the lantern 3, rendering the signal visible at night as well as in the day time, it being of course understood that the sema- phores are depended upon during the day, and the light by night.

It is to be understood that the cylinder 8 is intended to be charged at all times with train line air which is sufficient to hold the piston 7 at the upper limit of its movement within the cylinder, thereby maintaining the indicating devices in their normal or safety positions, but should the train line become disconnected at any point and the train line become depleted accidentally from any cause, it is clear that the pressure below the piston 7 will be reduced, and the bracket 5 permitted to move downwardly so as to bring the lenses 9 and the semaphores 13 to their indicating or operative positions. While the weight of the parts themselves may serve to effect this movement, I may if desired, mount compression springs 15 within the casing, the lower ends being secured to the bottom thereof and the upper ends secured to the arms of the bracket 5.

In connection with the main indicating parts of the apparatus, my invention comprehends a governor mechanism therefor designed to render the indicating devices positive in their action. In the present embodiment of the invention, the governor mechanism includes a casing 16 mounted within the caboose or last car at any convenient point and arranged for connection with the train line as indicated at 17. The train line air is arranged to enter a piston chamber 18 formed in the casing 16 and act against the face of the piston 19 mounted therein. The wall of the chamber 18 is provided at its inner end with a feed groove 20 designed to feed air around the piston 19 when the latter is moved backwardly in the chamber 18 to the end of its movement, the air passing through a groove 21 into a valve chamber 22 and thence through a port 23 to a reservoir 24 secured in any desired way to the casing 16 and located at any convenient point within the car. The stem of the piston 19 carries a slide valve 25 of the ordinary D type, the same being provided with a port 26 designed to register with a passage 27 formed in the wall of the casing 16 and leading to the indicator cylinder 8 which is provided for this purpose with ports 28.

From the foregoing description in connection with the accompanying drawings, it will be understood that when the train line is properly charged in the caboose or last car of the train to which the invention is applied, the air pressure within the chamber 18 will hold the piston 19 in position where the air will be permitted to feed through the grooves 20 and 21 into the valve chamber 22 and to the reservoir 24, the pressures being equalized in the reservoir and train line. In this position of the parts, moreover, it will be understood that the port 26 of the slide valve 25 will register with the passage 27 and the cylinder 8 will be properly charged, holding the indicating devices in an inoperative position. If, however, the train line parts or for some other reason becomes unduly depleted, the pressure in the chamber 18 will be reduced and overbalanced by the pressure in the reservoir 24, which will move the piston 19 within the chamber 18 in a direction to carry the slide valve 25 to the right, in the position of the parts as viewed in the drawings.

It is to be noted that in addition to the port 26, the slide valve is provided in its face with a groove 29 which will overlap the passage 27 and another passage 30 which leads to the atmosphere, preferably through a whistle (not shown). Hence the pressure in the cylinder 8 will be vented to the atmosphere through the passage 27, groove 29 and passage 30, and the piston 7 will be permitted to lower the lenses 9 and semaphores 13 being brought to an operative position indicating trouble or danger. It will of course be understood that after the parts have thus operated, the air pressure in the reservoir 24 is greater than the air pressure in the chamber 18 and ordinarily would resist the movement of the piston 19 to the left in the operation of restoring the indicating devices to their normal and inoperative positions. To overcome this, I have formed in the wall of the casing 16 an equalizing passage 31 in which there is a check valve 32 designed to prevent the charged air from passing into the chamber 22 or underneath the valve 25, except by means of the feed grooves 20 and 21. This passage 31 leads to the port face of the valve 25 and is designed to register with the port 26, when the piston 19 and valve 25 are moved to the right, whereupon it will be evident that the air from the reservoir 24 will pass into the chamber 18 and quickly equalize the pressures on the opposite faces of the piston 19, thereby permitting the recharging operation to be quickly accomplished.

The casing 1 is preferably provided at its bottom with a shoulder 1$^a$ extending into the cylinder 8 against which the rubber gasket 7$^a$ of the piston 7 will be pressed when the indicator is standing at normal, thereby forming an air tight joint.

Having thus described the invention what is claimed as new is:—

1. In an air brake indicator, the combination of a casing, a lantern mounted within the casing, the casing being provided with sight openings in registry with the lantern, lenses, a bracket carrying said lenses, a cylinder, a stem secured to the bracket and provided with a piston mounted within said cylinder, and a connection between said cylinder and the train line arranged to hold the lenses normally out of registry with the lantern.

2. In an air brake indicator, the combination of a casing provided with sight openings, a lantern mounted in the casing in registry with said sight openings, a forked bracket mounted in the casing and arranged to extend upwardly on opposite sides of said lantern, the arms of said bracket having their upper extremities forked, lenses secured in the forked extremities of the corresponding arms, a stem, to the upper end of which the bracket is secured, a piston secured on the lower end of said stem and a cylinder in which said piston is mounted for vertical movement, the cylinder having a connection with the train line arranged to hold the bracket at the upper limit of the movement with the lenses above and out of registry with the lantern.

3. In an air brake indicator, a casing, a cylinder arranged for connection with the train line, a piston mounted in said cylinder, a stem secured to said piston, a bracket secured to said stem, a semaphore pivotally connected to the casing and having an arm extending inwardly in the casing, and a link connection between said arm and the bracket.

4. In an air brake indicator, a casing, a cylinder arranged for connection with the train line, a piston mounted in said cylinder, a stem connected to said piston, a forked bracket secured to said stem, semaphores pivotally connected to the casing at opposite sides thereof and having inwardly extending arms, and links connecting the respective arms with the arms of the bracket.

5. In an air brake indicator, a casing, a forked bracket mounted in said casing, a stem to which said bracket is secured, a piston carried in said stem, a cylinder having an operative connection with the train line, the piston being mounted to reciprocate in said cylinder, indicating devices carried by said bracket and springs connected to the arms of said bracket and to the casing and arranged to move the bracket in a direction opposite to the movement of the bracket which is caused by the train line pressure acting against the piston.

6. In an air brake indicator, the combination of indicating devices including a cylinder and a piston mounted therein and arranged by the normal pressure of air in said cylinder to hold the indicating devices in an inoperative position, a governor mechanism arranged for connection with the train line and including a reservoir and means for establishing communication between the train line, reservoir and cylinder.

7. In an air brake indicator, the combination of indicating devices including a cylinder, and a piston arranged to hold the indicating devices in one position while the cylinder is charged, a governor mechanism including a casing embodying a piston chamber in communication with the train line, a valve chamber, a reservoir in connection with said valve chamber, a piston mounted in the piston chamber, a valve mounted in the valve chamber and movable by said piston, the casing being provided with feed grooves and said feed grooves arranged to establish communication between the reservoir, valve chamber and piston chamber in the normal position of the piston, the valve chamber being formed with a port arranged to establish communication between the valve chamber and cylinder in such position of the cylinder, and also provided with a groove arranged to vent to the atmosphere the air in said cylinder upon a reduction of train line pressure in the piston chamber.

8. In an air brake indicator, the combination of indicating devices including a cylinder and a piston therein arranged, when the cylinder is charged, to hold the indicating devices in a predetermined position, a governor mechanism including a casing embodying a piston chamber in communication with the train line, a valve chamber, and a reservoir in communication with said valve chamber, a piston mounted in said piston chamber, a valve mounted in the valve chamber and movable by said piston, the parts being so arranged that in one position of the piston the air pressures in the reservoir, valve chamber, and piston chamber will be equalized, the valve being provided with a port establishing communication with the valve chamber and said cylinder and with a groove arranged to vent to the atmosphere the air pressure in said cylinder upon a reduction of pressure in the piston chamber and a subsequent movement of the piston, the casing being provided with an equalizing passage extending from the piston chamber to the valve chamber and provided with a check valve preventing the air from passing from the piston chamber to the valve chamber, the port in the valve being arranged to register with one end of the equalizing passage upon a reduction of pressure in the piston chamber, whereby to permit the air from the reservoir to flow through said passage into the piston chamber and equalize the pressure in said chamber and reservoir.

In testimony whereof I affix my signature in presence of two witnesses.

ODIE R. SNYDER. [L. S.]

Witnesses:
JAMES G. JOHNSON,
CHARLES M. SEYMOUR.